Figure 1:
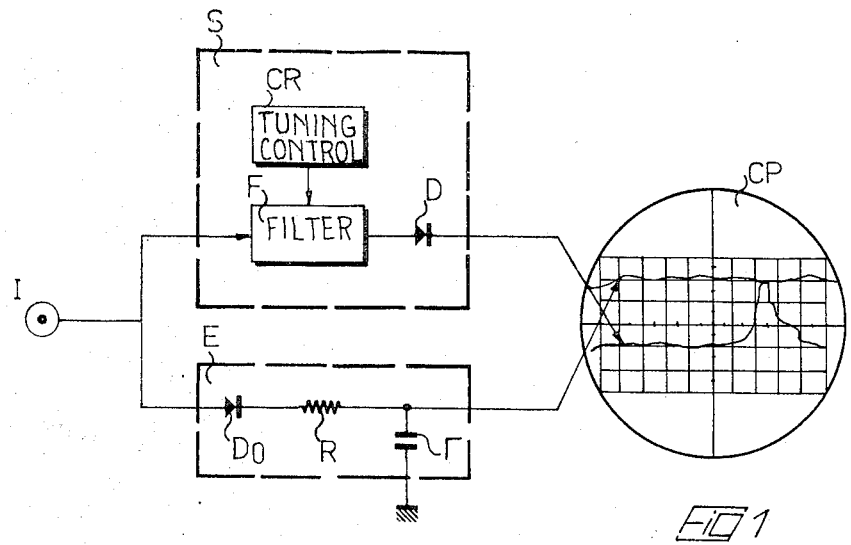

United States Patent [19]

Carre et al.

[11] 3,800,235

[45] Mar. 26, 1974

[54] COHERENCE DETECTING PROCESS AND DEVICE

[75] Inventors: Roland Carre; Marcel Constant, both of Paris, France

[73] Assignee: Thomson-CSF, Paris, France

[22] Filed: Jan. 31, 1972

[21] Appl. No.: 221,888

[30] Foreign Application Priority Data

Feb. 16, 1971 France .......................... 71.05198

[52] U.S. Cl. ............................. 328/133, 328/149
[51] Int. Cl. ............................................. H03b 3/04
[58] Field of Search ............... 328/133, 149, 167; 307/233, 295

[56] References Cited
UNITED STATES PATENTS

| 2,952,811 | 9/1960 | Carr | 328/149 |
|---|---|---|---|
| 3,675,136 | 7/1972 | O'Brien | 328/133 |
| 3,050,728 | 8/1962 | Worley | 328/133 |
| 3,101,448 | 8/1963 | Costas | 328/133 |
| 2,794,928 | 6/1957 | Frank | 328/149 |
| 2,964,622 | 12/1960 | Fire | 328/133 |
| 2,924,706 | 2/1960 | Sassler | 328/133 |
| 3,048,782 | 8/1962 | Altman | 328/133 |
| 3,699,462 | 10/1972 | Kietzer | 307/232 |
| 3,675,131 | 7/1972 | Pickholtz | 328/133 |

Primary Examiner—Rudolph V. Rolinec
Assistant Examiner—R. E. Hart
Attorney, Agent, or Firm—Cushman, Darby & Cushman

[57] ABSTRACT

In order to determine rapidly whether successively received pulses are coherent or not, the said pulses are processed simultaneously through two parallel channels, one of the channels forming the enveloppe of the pulses and the other one effecting an aperiodic detection of the pulses.

The level of the output signals of the two channels are compared, only coherent pulses giving rise to equal output signals.

10 Claims, 2 Drawing Figures

COHERENCE DETECTING PROCESS AND DEVICE

It is often necessary to determine, in the presence of successive pulses having the same carrier frequency, if these pulses are coherent or not, that is to say, if they come from the division of a continuous wave or not. This problem arises for example in radio measuring laboratories, in E.C.M.

A known process for revealing coherence comprises effecting a coherent integration of successive signals. This process requires a rather large number of signals and is consequently relatively slow.

An object of the invention is to provide a process and device for detecting the coherence of pulses, which are both simple and rapid, that is to say, effective in the presence of only a few pulses ; the principle of the detecting process according to the invention is the comparison of the mean value of the envelope of the signals received with the signal obtained by filtering the received signals in a narrow-band filter displaced slowly within the frequency range in which the carrier frequency is probably found (range determined by other known means which are not part of the invention).

Without going into the details of questions of spectral densities of the different lines, it can be seen that in the presence of a non-coherent emission, the mean value is higher that the level of the filtered signal, even at the moment when the filter is centered on the frequency of the carrier frequency.

According to the invention, there is provided a process for detecting the coherent character of a group of successive pulses having the same carrier frequency, said process comprising the following steps :

treating the pulses in two different parallel channels, respectively a spectral analysis channel and an aperiodic detection channel ; and comparing the output signals of the two channels.

According to the invention there is also provided a device for detecting the coherent character of a group of successively received pulses having the same carrier frequency, said device comprising :

an general input for said pulses ;

a first channel coupled to said general input, for effecting an aperiodic detection of said pulses, said first channel having a first output ;

a second channel, for effecting the spectral analysis of said pulses, said second channel having a second output ; and ;

comparing means having a first and a second inputs respectively coupled to said first and second outputs.

Figure 2:
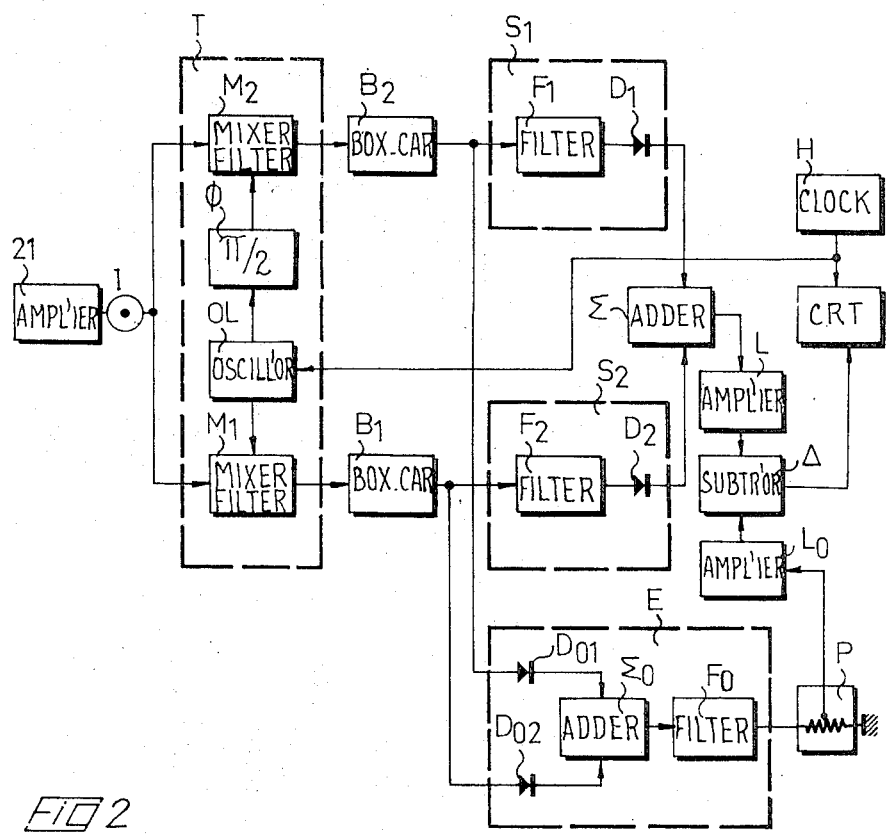

A better understanding of the invention will be had from the ensuing description with reference to the accompanying figures in which :

FIG. 1 is a diagram showing the principle of the coherence detection according to the invention and FIG. 2 shows a preferred embodiment of the coherence detecting device according to the invention.

The detecting process according to the invention comprises comparing the level of the pulses filtered in a narrow-band filter with the mean value of their envelope ; for this purpose, the pulses are applied at I, as shown in FIG. 1 , to two parallel channels :

the channel E for detecting the envelope, and the channel S for effecting a selective filtering.

The channel E can be formed very simply by an envelope detector (for example a diode $D_o$) and a resistor R connected in series, and a capacitor $\Gamma$ in parallel, the latter two elements constituting a low-frequency filter.

The channel S comprises a narrow-band filter F and a detector D of the same type as that employed in the channel E ; the tuning frequency of the filter varies slowly under the control of the control device CR within a frequency range comprising the carrier of the pulses whose frequency was determined a priori by known means to within ± 10 percent or 20 percent .

As a rule, equality of the signals at the outputs of the channels E and S is obtained if the pulses are coherent , when the carrier frequency is within the band of the filter; the two channels in fact measure at this moment the same magnitude by different processes. If the pulses are not coherent, the spectral density within the band of the filter is always lower than that of the signals of the channel E and the output level of the channel S is lower than that of the channel E.

The coherence is therefore detected by the comparison in CP of the output levels of the two channels, for example on the screen of a cathode ray tube where the time is plotted as abscissae and the levels as ordinates. If the law frequency-time of variation of the frequency of the filter F is fixed, it is also possible to graduate the abscissae in frequencies. In any case, the central frequency of the filter, at the instant when the levels are equal, gives a more precise indication of the carrier frequency.

The diagram shown in FIG. 1 is a very general diagram intended to explain the principle of the detecting process according to the invention. In this diagram, the circuitry comprising the unit F and the control CR represents the most general selective filtering device having a variable tuning.

In practice, it is not always easy, although possible, to vary directly the frequency of a filter proper, and the relative sweep : nominal frequency of the filter-frequency of the input signal, will be preferably obtained through varying, by means of a frequency change, the frequency of the input signal of the filter.

This is what is done in the device shown in FIG. 2 where references similar to those in FIG. 1 have the same signification as in the latter Figure.

The pulses to be checked which have been, if desired , translated into an intermediate frequency and amplified at 21, are applied to the terminal I ; placed between the latter, on one hand, and, on the other hand, the envelope E channel and the selective filtering channels $S_1$ and $S_2$ defined hereinafter, is a circuit T for the translation of the intermediate frequency into low frequency, which cooperates with the channels $S_1$ and $S_2$ , the frequency of the local translation oscillator OL being swept slowly, for example linearly.

The circuit T comprises two low-pass filter-mixer units $M_1$ and $M_2$ connected, on one hand, to the input terminal I and, on the other hand, to the output of the oscillator OL, one directly and the other through a phase shifter of $\pi/2$ , $\phi$.

The low-frequency signals at the output of the mixers-filters M1 and M2 are respectively applied to the identical selective filtering channels $S_1$ and $S_2$ each of which comprises a narrow low-pass filter , $F_1$ , $F_2$ followed by a square-law detector $D_1$ , $D_2$ . The output signals of the detectors are added at $\Sigma$ . The assembly of the channels T, $S_1$ and $S_2$ , and $\Sigma$ is equivalent to the channel S shown in FIG. 1 with that exception that the frequency sweep is effected at the level of the local oscillator instead of at the level of the filter ; this changes in no way the principle of determining the coherence (or the absence of coherence) of the pulses. The sum signal at the output of Σ is compared at CP with the signal of the envelope channel E, wich comprises two square-law detectors $D_{01}$ and $D_{02}$ which are respectively connected to the outputs of the mixers-filters, an adder $\Sigma_o$, connected between the outputs of the detectors $D_{01}$ and $D_{02}$ and the low-passfilter $F_o$.

The comparison circuit comprises in this example a subtractor Δ, one input of which receives the sum signal from Σ and the other an adjustable fraction, adjustable for example by means of the potentiometer P, of the envelope signal. The output signal of the subtractoer can be employed in any known manner (oscilloscope, recorder, calculator ...). In the case of a CRT oscilloscope, the signal input of the latter is connected to the output of the subtractor, the abscissa sweep of the screen being synchronized with the frequency sweep of the oscillator by the clock H. Thus it can be said that the coherence of the signals is "seen."

The output signal of the channel E is here attenuated so as to have a signal at the output of the comparator Δ only if the difference S—αE is positive, α being the coefficient of attenuation and S and E designating the amplitudes of the signals at the outputs of the channels of the same names respectively. A signal appears at the output of the comparator only at the moment when the tuning frequency of the filter coincides with that of the coherent signal. Adjustment of the potentiometer permits evaluating the quality of the coherence.

A box-car ($B_1$, $B_2$) is connected in series to the output of each of the mixers M1 and M2. It permits the storage, during each period of recurrence, of the amplitude of the pulses (in fact there are obtained the amplitudes of the sines and cosines of the difference in phase between the received pulse and the signal of the local oscillator), the filters thus treating the peak values of the video frequency pulses, and the detection of the coherence will not depend on the filling rates of the received emissions, if it concerns for example an electromagnetic detection receiver which seeks to identify the pulse carrier.

In order to avoid producing a widening of the spectral lines which might result in an erroneous appearance of the coherence criterium (quality of the signals applied to the comparator), it might be preferable, in certain applications, to avoid placing a limiter at the input of the device. A logarithmic amplifier could at the most be employed in cases where the maximum level of the pulses varies too much to permit the use of a fixed gain amplifier.

On the other hand, video-frequency logarithmic amplifiers L and $L_o$ could be advantageously placed upstream of the two inputs of the subtracter Δ to bring the output dynamic of the latter to an easily utilizable value.

The coherence criterium appears when there is both effectively coherence and equality between the frequency of the signals applied to the filter and the nominal frequency of the latter. Up till now, no hypothesis has been made as to the constancy of the frequency of recurrence, which may or may not be wobbulated. If this frequency is fixed, the coherence criterium will also appear each time that $f = f_o + kf_r$, in which $f_o$ is the frequency of the coherent signal, $f$ the tuning frequency of the filter, $f_r$ the frequency of recurrence and $k$ some integer.

The frequency sweep can of course be automatic ; the period of recurrence of the latter depends in particular on the characteristics of the treated pulses (duration, period of recurrence).

The common width Δ$f$ of the bands of the filters F1 and F2 is related to the number $n$ of pulses capable of being integrated in a coherent manner in the channel S. This number governs the contrast or signal-noise ratio at the output. It is substantially equal to $f_R/\Delta f$. The contrast obtained is of the order of n and the total integration time, or the time of the passage of the signal in the filter, is $ti = n/f_R$ in which $f_R$ is the mean frequency of recurrence of the treated pulses.

The described process and embodiments are applicable to all pulses irrespective of their carrier and recurrence frequencies. In the case where the frequency sweep is achieved by the translation of the frequency of the signal to be analyzed, sufficiently stable translation oscillators must be employed.

Of course, the invention is not limited to the embodiment described and shown which was given solely by way of example.

What is claimed is:

1. A process for detecting the coherent character of a group of successive pulses having the same carrier frequency comprising the following steps:
    simultaneously applying the pulses to two different parallel channels, where the two channels are respectively a spectral analysis channel and an aperiodic detection channel; processing the pulses through the two channels with the aperiodic detection channel functioning to form a total energy output signal, and the spectral analysis channel functioning to form a spectral energy output signal of the energy contained in a relatively narrow band at the carrier frequency of the pulses; and comparing the spectral energy output signal to the total energy output signal whereby substantial equality therebetween is an indication of the coherent character of the group of pulses.

2. A device for detecting the coherent character of a group of successively received pulses having the same carrier frequency, said device comprising
    a general input (1) for said pulses; a first channel (E) coupled to said general input, said first channel comprising aperiodic detection means for forming a total energy output signal; a second channel (S) coupled to said general input, said second channel comprising spectral detection means for effecting the spectral analysis of said pulses for forming a spectral energy output signal of the energy contained in a relatively narrow band at the carrier frequency of the pulses; and comparing means for comparing said spectral energy output signal to said total energy output signal.

3. A device as claimed in claim 2, wherein said aperiodic detection means comprises a detector and a low-pass filter in series.

4. A device as claimed in claim 3, wherein said spectral detection means comprises a narrow band filter and a detector coupled in series.

5. A device as claimed in claim 4 wherein said narrow band filter has a frequency control input, said spectral detection means further including means for generating a frequency control input signal for displacing the central frequency of said narrow band filter.

6. A device as claimed in claim 2 including frequency translation means interposed between said general input and said channels for translating the input signals of successively received pulses into signals of lower frequency, and frequency sweep means associated with said frequency translation means for controlling the lower frequency into which the input signals are translated.

7. A device for detecting the coherent character of a group of successively received pulses having the same carrier frequency, said device comprising a general input (1) for said pulses; a first channel (E), coupled to said general input, for effecting an aperiodic detection of said pulses, said first channel having a first output; a second channel (S), for effecting the spectral analysis of said pulses, said second channel having a second output; and comparing means having first and second inputs respectively coupled to said first and second outputs, and including between said general input and said channels a circuit (T FIG. 2) for translating the input signals into signals of lower frequency, and frequency swept, and wherein said first channel (E) comprises two square-law detector ($D_{01}$, $D_{02}$) having respective inputs and respective outputs, an adder having two inputs coupled to said square-law detector outputs, and an output, and a low-pass filter coupled in series between said adder output and said first channel output;

said second channel comprises a first and a second identical subchannels ($S_1$, $S_2$) in parallel, each subchannel comprising in series a narrow-band filter ($F_1$, $F_2$) and a square-law detector ($D_1$, $D_2$) having an output, and an adder ($\Sigma$) having two inputs respectively coupled to the said second channel detector outputs and an output forming said second channel output;

said circuit comprises a frequency swept oscillator (OL) having an output, $\pi/2$ phase shifting means ($\phi$) having an input coupled to said oscillator output, and an output, a first mixer-low pass filter unit $M_1$ having an input coupled to said general input, an input coupled to said oscillator output and an output coupled to said first subchannel filter; and a second mixer — low pass filter unit ($M_2$) having an input coupled to said general input, and input coupled to said phase shifter output, and an output coupled to said second subchannel filter.

8. A device as claimed in claim 7, further comprising clock means having an output, and wherein said comparison circuit comprises a substractor ($\Delta$) having two inputs respectively coupled to said first and second channel outputs and an output, a display tube having a signal input coupled to said substractor output, a synchronization input coupled to said clock output;

said oscillator (OL) comprises a frequency control input coupled to said clock output.

9. A device as claimed in claim 8, wherein a first box car is connected in series between the output of said first unit and the filter of said first subchannel and a second box car is connected in series between the output of said second unit and the filter of said second subchannel.

10. A device as claimed in claim 8, further comprising an adjustable attenuation circuit (P) between said first channel output and said comparing means first input.

* * * * *